United States Patent Office 3,430,235
Patented Feb. 25, 1969

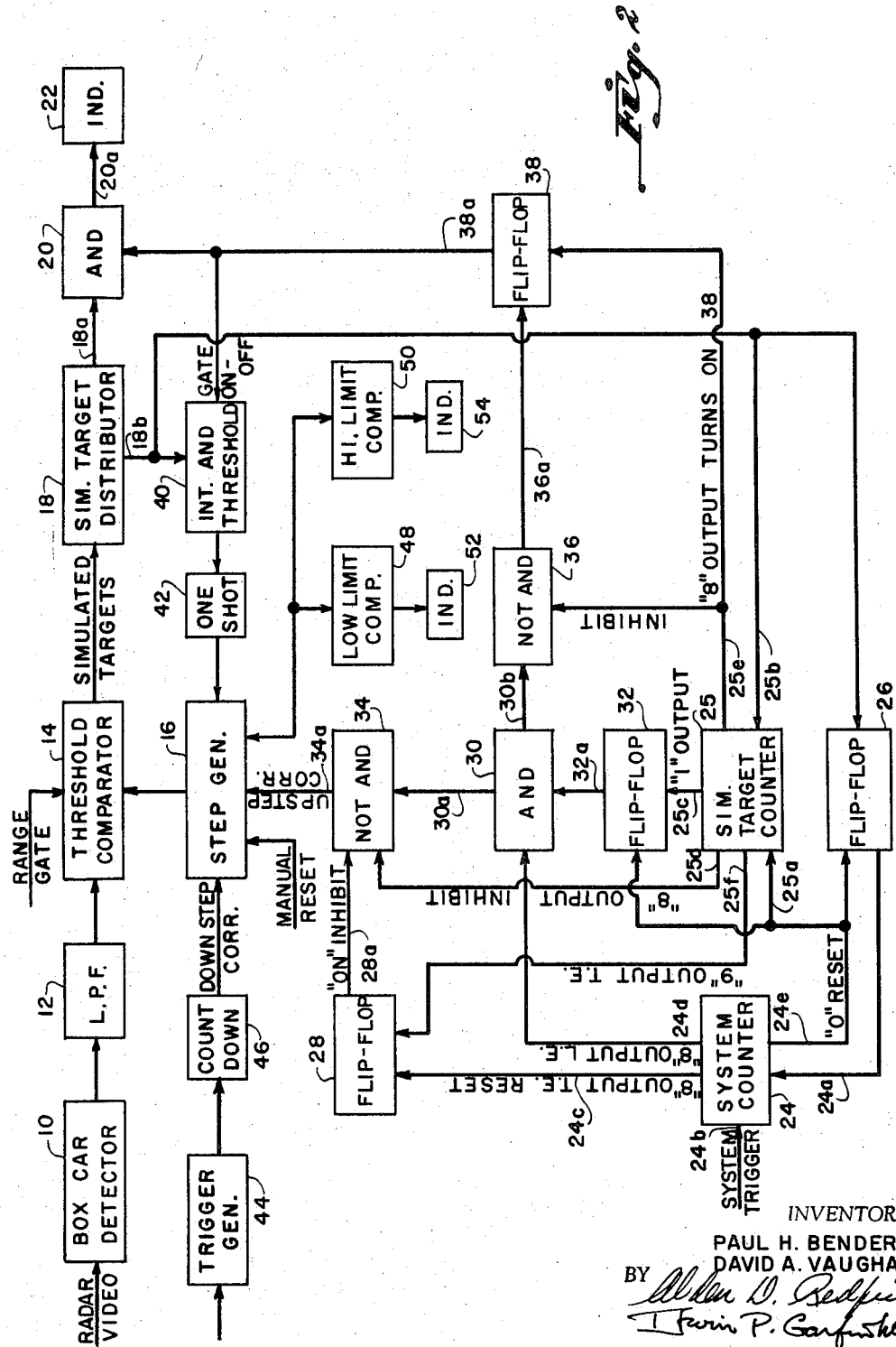

3,430,235
AUTOMATIC SIGNAL DISCRIMINATOR AND THRESHOLD ADJUSTMENT CIRCUIT FOR RANGE-GATED RADAR DETECTION SYSTEMS
Paul H. Bender and David A. Vaughan, Cincinnati, Ohio, assignors to Avco Corporation, Cincinnati, Ohio, a corporation of Delaware
Filed May 1, 1964, Ser. No. 364,103
U.S. Cl. 343—7
Int. Cl. G01s 9/02
17 Claims This invention relates to a system for discriminating against false-alarm signals and for automatically providing a threshold adjustment for establishing a stable constant false-alarm rate under normal conditions as well as under high noise or electronic countermeasures environment. The invention is applicable to radar detection systems using amplitude modulation and range-gating techniques.

The use of range-gating techniques results in a multiplicity of independent signal channels in which separate decisions must be made. Each range-gated channel must be comparatively adjusted with all other channels to maintain an over-all system sensitivity and false-alarm rate. Achievement of a uniform sensitivity for all the range-gated channels on a static-adjustment basis is difficult and invariably leads to a reduction in over-all system sensitivity. To maintain system sensitivity at its maximum capability, this invention provides a dynamic system for automatically adjusting both sensitivity and the desired-false-alarm rate of each individual range-gated channel.

This invention provides an automatically adjusted threshold circuit to maintain the output sensitivity of a particularly range-gated channel at a given false-alarm rate regardless of long-term gain and reference voltage instabilities. The automatic threshold circuitry senses a higher false-alarm rate than is presented to the tactical output indicator of the radar and utilizes this information to provide a constant false-alarm rate at the radar indicator without impairment to presentation of true target information. In the absence of a false alarm, the sensitivity of the system is increased at a constant rate or in periodic steps, for example, after three nods or sweeps of the radar antenna, or after a preset time. Each time a false alarm is sensed, a corrective voltage is introduced into the signal channel to rapidly decrease channel sensitivity by a given amount. Thus, the system tends to hunt around that sensitivity level which insures the best compromise between false-alarm rate and signal-sensitivity level. The exact false-alarm rate that is to be maintained is controlled by adjusting the magnitude of the signal channel sensitivity correction steps.

Discrimination between a false-alarm and a true-target rate is based on two arbitrary decisions derived from radar system parameters, such as antenna slew or nod rate, and antenna beam width. The first decision is that a number of pulses in a burst below a given number is indicative of noise, and consecutive pulses occurring above that number are considered true target. Less than the given number of consecutive pulses results in a channel sensitivity correction, while more pulses produce no channel sensitivity correction, but are applied to the radar indicator. The second decision is that more than another given number of pulses in a burst is not a true signal, but is a false alarm. Thus, if the radar environment should suddenly change to a condition in which information in each or any particular range gated channel produces an output indicative of a continuous target, for example, resulting from enemy electronic counter-measures, the system automatically resets the threshold of that particular gate to a lower sensitivity to re-establish the new false-alarm threshold. The system also provides that if a fault in the individual gate circuit causes a rapid reduction or increase in sensitivity, the automatic restoration will continue to operate until a control level is established which is indicative of the fault existing, and a visual alarm is automatically indicated.

It is the primary object of this invention to provide a range-gated radar system capable of discriminating between a true target and a false alarm, and for automatically adjusting the threshold of the system in the presence of a false alarm to dynamically provide maximum operating sensitivity under all conditions.

Another object of this invention is to provide a system for the automatic adjustment of both the sensitivity and the desired false-alarm rate in each of the range-gated channels of radar detection apparatus.

Another object of this invention is to provide an automatically adjustable threshold circuit using digital-to-analog feedback means for controlling the threshold level of each channel of a range-gated radar.

Another object of this invention is to provide threshold circuitry adjusted to sense a higher false-alarm rate than is presented to the radar indicator and to which a corrective voltage is introduced to decrease channel sensitivity each time a false-alarm signal is sensed.

Still another object of this invention is to automatically optimize the signal/noise and signal/clutter discrimination for presenting optimum intelligence from true targets.

Still another object of this invention is to continuously increase receiver sensitivity until a false alarm is detected, and then provide a correction to decrease sensitivity until the false alarm is eliminated, whereby the sensitivity of the receiver hunts at the optimum level.

For further objects and advantages and for a better understanding of the precise nature of this invention, reference should now be made to the accompanying drawings in which:

FIGURE 2 is a block diagram of the over-all system;

Figure 1:
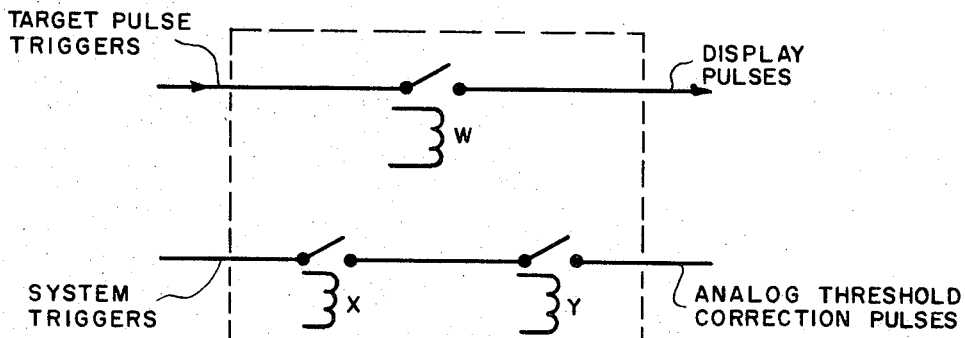
FIGURE 1 is a schematic representation of the basic system logic.

The basic logic circuitry for maintaining optimum receiver sensitivity is shown in FIGURE 1. If no false alarms and detected, the circuitry permits target display and a timed increase is receiver sensitivity. If a false alarm is detected, the logic circuitry prevents target display, and permits a reduction in receiver sensitivity. The logic circuitry has two inputs. One input is a clock line of system triggers, the second is a clock line of triggers derived from the return target pulses. Particular thresholds are arbitrarily established; for example, if less than eight pulses are received, it is assumed that the pulses are noise. If more than a hundred pulses are received, it is assumed that they result from electronic countermeasures. If the number of pulses in a burst exceeds the threshold number of eight, the system serves to close the relay W and all subsequent target pulses are passed onto the radar indicator for display. The relay X is closed until the threshold number is reached, at which time it opens. Relay Y closes when the burst of pulses terminates. If the pulse input train is less than the threshold number, relay Y will close before relay X has opened, and a system trigger is passed to the threshold circuitry as a correction pulse. If the pulse train exceeds the threshold, relay Y will not close until after relay X has opened, and no correction pulse occurs, unless and until the number of pulses in the burst exceed the upper limit.

It is apparent, therefore, that two timing signals are generated by the system. The first timing signal simultaneously closes relay W and opens relay X when the threshold number of target pulses has been counted. The second signal closes relay Y when the burst of pulses terminates. The timing signals are derived from electronic counters.

The block diagram of FIGURE 2 indicates a complete receiver system beginning with the radar video input pulses. All detected radar video input pulses resulting either from a true target or a false alarm, such as noise or enemy jamming, are applied to a box-car detector 10. The box-car detector 10 conditions the received pulses by converting them into square waves having a magnitude proportional to that of the received pulse and a duration coincident with the periods between the particular range gates. As is known, a range gate is a small finite period representing a given range. The use of the narrow-band box-car detector is not essential to the use of the invention technique and is indicated for illustration only. The invention applies equally well to thresholding of raw unipolar video outputs.

The output of the box-car detector 10 is filtered in a low-pass filter 12 which passes an essentially direct voltage to a threshold comparator 14. The level of the threshold comparator is set internally and by means of a step generator 16, the function of which is to develop an output voltage for adjusting the threshold level of comparator 14. Also applied to the threshold comparator are the range-gate pulses which appear as synthetic or simulated target pulses at the output of the comparator 14 only when the direct voltage output of the filter 12 exceeds the established threshold level. Thus, the level of the threshold comparator sets the sensitivity level of the radar receiver.

The simulated target output pulses from the threshold comparator 14 are applied to a simulted target distributor 18 which provides two paths 18a and 18b for the simulated target pulses, one through a normally closed AND gate 20 to the radar indicator 22, and the second to the logic circuitry for controlling the step generator 16, or for opening the AND gate 20.

Figure 3:
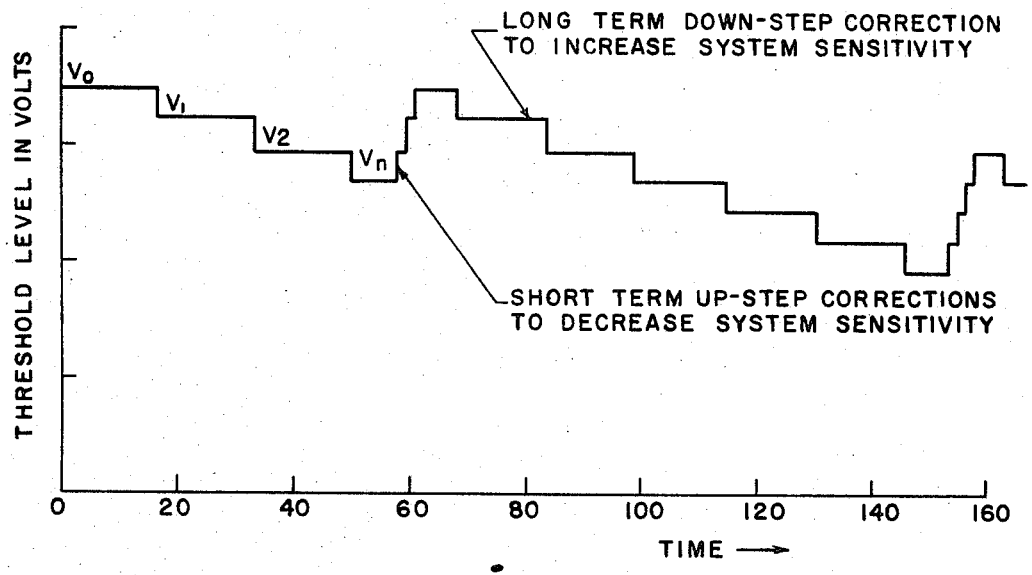
FIGURE 3 is a series of curves showing the up-step and down-step voltages developed by the system.

Referring to FIGURE 3, the threshold level of the comparator 14 is set at a high threshold, low sensitivity level $V_0$. The step generators 16 is an electronic potentiometer having a controlled voltage output level. The step generator is controlled by two oppositely acting sources. One source is the pulse output of a trigger generator 44 supplied through a countdown circuit or timer 46. These trigger pulses apply a down-step correction to the step generator 16 for decreasing the threshold level of comparator 14. The trigger pulses continuously produce a down-step correction once every given period, for example, once every 16 seconds, so that the threshold level is decreased as shown in FIGURE 3 is step functions from $V_0$ towards a maximum sensitivity $V_n$. The sensitivity will continue to change along the prescribed characteristic curve $V_0$ to $V_n$ so long as the false-alarm rate is tolerable, that is, so long as the system does not detect consecutive pulses totaling less than eight or more than one hundred in number. However, if the system determines the presence of a false alarm, such as noise or enemy countermeasures, the step generator 16 receives an output from the second source, that is the logic circuitry, and it provides an output to automatically reset or up-step the threshold level of comparator 14 in a few milliseconds towards the $V_0$ level so that essentially instant correction results. Then, hunting towards maximum sensitivity, by means of the down-step correction from the trigger generator 44, repeats. This action is continuous during the operation of the equipment, and it tends to maintain the receiver at the maximum usable information points compatible with instantaneous signal strength versus incident noise. The step generator 16 also includes a manual reset which permits an operator to up-step the threshold level.

Figure 4A:
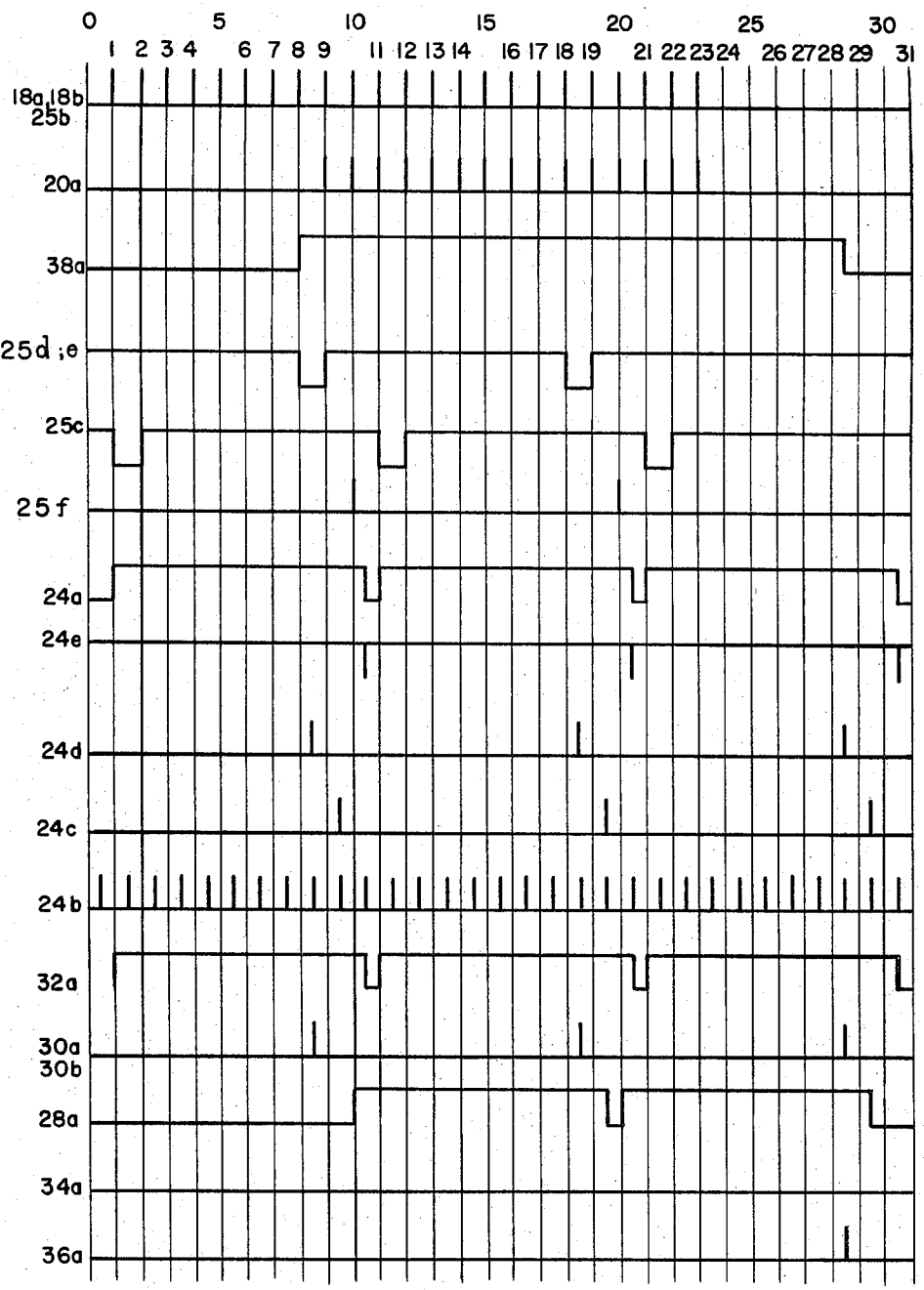
FIGURES 4A and 4B are a series of curves showing the outputs from various portions of the system under two different operating conditions.
Figure 4B:
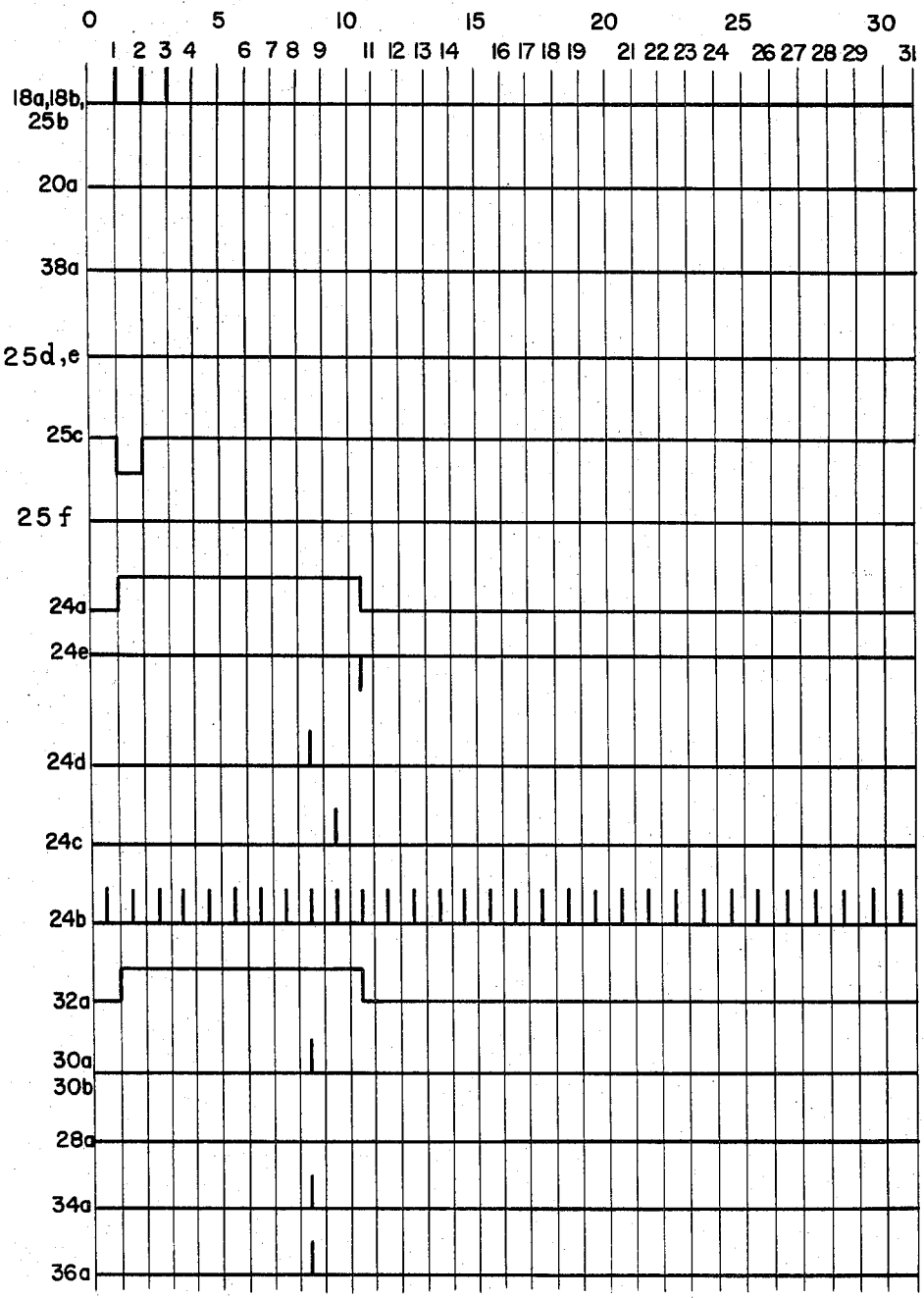

To control the opening or closing of AND gate 20, and to provide the up-step correction from step generator 16, the logic circuitry incorporates a system counter 24 and a simulated target counter 25. In the embodiment illustrated, each of these counters is of the decade type to accommodate the particular chosen parameters, but binary or other type counters may also be used. The counters 24 and 25 operate at the same rate, but the counts are out of phase by an amount proportional to range. While the simulated pulses actually lag the system pulses if it's more convenient to describe this system in the reverse terms; that is, for this description it is assumed that the system pulses are lagging. The counter 24 is the system clock and has two inputs, one at 24a from the output of a flip-flop 26, and one at 24b from the system trigger. (In following the circuit logic, reference-should be made to waveforms of FIGURES 4A and 4B, each of which is designated with the same reference character as the line at which the waveform occurs.) The flip-flop 26 is initially in its "off" state (as are all the flip-flops in the circuit), but when transferred to its "on" state, serves to start the system counter 24. The counter then counts each of the system trigger input pulses which are synchronized with the main bang of the radar. The flip-flop 26 is supplied with the output at line 18b of the simulated target distributor 18 and changes state (from "off" to "on") upon receipt of the first simulated target pulses. The "on" state starts the system counter 24.

The system counter 24 has three outputs. The first output is an "8" count pulse occurring at line 24c at the instant of the trailing edge of the eighth system counter pulse. This "8" count pulse is applied to a flip-flop 28 and serves to reset it to its "off" state if it had previously been "on." (The flip-flop 28 is equivalent to the relay X of FIGURE 1.)

The second output from the system counter 24 is an "8" count pulse at line 24d occuring at the time of counting of the leading edge of the eighth system counter pulse and is applied to an AND gate 30.

The third output is a "0" count pulse at line 24e occuring at the time of counting of the tenth system trigger pulse and is applied simultaneously to the flip-flop 26, the simulated target counter 25 at line 25a, and a flip-flop 32. The "0" count pulse resets flip-flop 26 to "off" to stop the system counter 24 after the tenth count, it resets the simulated target counter 25 to zero, and it resets flip-flop 32 to its "off" state if it has been "on."

The simulated target counter 25 receives an input at 25b from the simulated target distributor 18, the first pulse from the simulated target distributor 18 serving to start its count.

The counter 25 has four outputs. The first simulated target pulse counted provides a "1" count pulse at line 25c which serves to change the state of flip-flop 32 from its initially "off" output condition to an "on" output condition at line 32a, the "on" ouput being applied to the AND gate 30. The AND gate 30 may then deliver the "8" count pulse of counter 24 to NOT AND gates 34 and 36 through lines 30a and 30b.

The second output at line 25d from the simulated target counter 25 is an "8" count inhibiting pulse which occurs on the counting of the eighth simulated target pulse and is applied to a NOT AND gate 34 (equivalent to relay Y in FIGURE 1). The output from the NOT AND gate 34, if any, serves to produce an up-step correction from the step generator 16, but such an output is inhibited by this "8" count pulse.

The third output from counter 25 is also an "8" count pulse, produced at line 25e, and applied to the NOT AND gate 36 to inhibit its output, and to flip-flop 38 to change its state from "off" to "on." The "on" state of flip-flop 38 opens AND gate 20 to permit a display on the indicator 22 of the simulated targets from the distributor 18. (NOT AND gate 36 and flip-flop 38 together are equivalent to relay W in FIGURE 1.) When NOT AND gate 36 develops a pulse output, it triggers the flip-flop 38 to "off," thereby closing AND gate 20.

The fourth output, a "9" count pulse at line 25f, serves to change the state of flip-flop 28 from "off" to "on." The "on" state of flip-flop 28 inhibits NOT AND gate 34, as does the "8" count pulse from line 25d.

In the operation of the system as thus far described, the simulated targets are displayed on the indicator 22 only when the AND gate 20 is supplied with simulated target pulses from the distributor 18 and with an "on" output present from flip-flop 38. Flip-flop 38 is initially in its "off" state. It is maintained in its "off" state by the absence of an "8" count pulse from the counter 25. For the purpose of explaining the operation, it will be assumed that only three simulated target pulses are produced. Since this number has been defined as a false alarm, it is desired that the flip-flop 38 remain off, and than an up-step correction be developed from NOT AND gate 34. (For the waveforms developed by the system upper false-alarm conditions, refer to FIGURE 4B.)

The first of the three pulses from the simulated target distributor 18 starts the counter 25 and changes the state of flip-flop 26 from "off" to "on" to start the system counter 24 which counts the system triggers that are continuously present at 24b. The "1" count output pulse (at line 25c) of simulated target counter 25 changes the state of flip-flop 32 from "off" to "on." The simulated target counter 25 will have no outputs at 25d, e, or f because the count reaches only three.

System counter 24 continues to count at the pulse repetition rate and deliver its "8" count outputs at lines 24c and 24d. The "8" count output at 24c is of no consequence since flip-flop 28 is initially in its "off" state and the "8" count simply keeps it in that state. However, the "8" count pulse at 24d is applied to AND gate 30, to which is also applied the "on" output of flip-flop 32. Since two inputs have been applied to the AND gate 30, a pulse output is developed at lines 30a and 30b. The pulse output at 30a passes through the NOT AND gate 34 since NOT AND gate 34 is not inhibited either by an "on" output from flip-flop 28 or by an "8" count pulse at line 25d. The output pulse developed from the output of NOT AND gate 34 provides an up-step correction voltage to the step generator 16, which in turn changes the threshold level of threshold comparator 14 to a less sensitive condition.

Note that the flip-flop 38 has been maintained in its "off" state since an "8" count output was not developed at line 25e, and therefore the AND gate 20 remains closed and the three pulses, a false alarm, are prevented from display on the indicator 22.

The system counter 24 continues its count until pulse ten or zero, at which time it produces a "0" count pulse at line 24e to reset counter 25 to zero, to reset flip-flop 32 to "off," and to reset flip-flop 26 to "off." Flip-flop 26 in turn disables the system counter 24 so that it stops counting.

This completes the action of the circuit unless the up-step correction was not sufficient to prevent another series of false alarms from appearing at the simulated target distributor 18. If additional false alarms are present, the entire process repeats until the threshold level of the comparator 14 is raised to a level to decrease the sensitivity sufficiently to eliminate the false alarms. Remember, however, that the trigger generator 44 repeatedly provides a down-step correction at approximately 16-second intervals, and the system will again seek a maximum sensitivity until a false alarm is again detected, when an up-step correction results. Thus, the system will hunt at that sensitivity level where false alarms are just barely present.

Let it now be assumed that the radar antenna is illuminating a target such that a burst of twenty-three pulses are gated through the simulated target distributor 18 when the antenna scans through a target. (For the waveforms generated by the system under these conditions, refer to FIGURE 4A.) As before, the first pulse from the simulated target distributor 18 will start the counting of the simulated target counter 25 and will change the state of flip-flop 26 from "off" to "on," thereby starting the system counter 24. The "1" count output at line 25c of simulated target counter 25 will change the state of flip-flop 32 from an "off" output to an "on" output, which is applied to the AND gate 30.

When an "8" count output is developed from the system counter 24 at line 24d, outputs are developed from the AND gate at lines 30a and 30b. However, under conditions where a true target is detected, the simulated target counter also reaches an "8" count and produces "8" count outputs at 25d and 25e. The "8" count output at 25d inhibits the NOT AND gate 34, preventing an up-step correction output from NOT AND gate 34. Similarly, an "8" count pulse at 25e inhibits the NOT AND gate 36 to prevent the development of an "off" trigger for flip-flop 38, while the same "8" count pulse is applied directly to flip-flop 38 to change its state from "off" to "on." This opens AND gate 20 and allows the simulated target pulses from distributor 18 to pass through and be read out on the indicator 22. Thus, the logic circuit has electronically said that the target is present and that the system is ready to present the target waveform for display.

System counter 4 and simulated target counter 25 are reset by the "10" or "0" count output at line 24e of system counter 24, and the action is repeated as targets eleven through twenty are counted by the simulated target counter 25. However, the flip-flop 38 is now in its "on" state and all pulses out of distributor 18 are displayed.

As the last three target pulses from the distributor 18 come through the simulated target counter 25, the problem is to prevent the logic circuit from producing an up-step correction as it counts the less than eight pulses. As previously described the circuit will give a false alarm logic for a one to seven count, but now due to the train of pulses preceding the last three pulses, a false alarm must be held off.

Note that flip-flop 28 is in an "on" state due to the "9" count output at line 25f of simulated target counter 25. This fact has not been of consequence until now.

Resetting to "off" occurs again on the eighteenth count and to "on" on the nineteenth count, thereby again inhibiting NOT AND gate 34. The inhibiting or "on" state of flip-flop 28 will continue until the next "8" count at the twenty-eighth pulse and hold off the up-step correction output of NOT AND gate 34 until after that time. The flip-flop 28 is again reset at the twenty-eighth count by the "8" count pulse developed by system counter 24 at line 24c. Since there are only twenty-three simulated targets, the simulated target counter will not produce an "8" count output pulse at the twenty-eighth count, and therefore the NOT AND gate 36 will be uninhibited and an "off" trigger to the flip-flop 38 is produced and the AND gate 20 is closed to prevent further display.

If any false alarm occurs between the resetting of flip-flop 28 and the next antenna scan of the target, the system is again in condition to produce the proper false-alarm threshold correction.

The system also includes means for closing the AND gate when more than a hundred pulses from the simulated target distributor 18 are counted. For this purpose there is included an integrator and threshold circuit 40 having an input coupled to the output of the distributor 18. The function of the integrator and threshold circuit 40 is to integrate the pulses applied from the distributor 18 until a predetermined threshold equivalent to a hundred pulses is exceeded, at which time the circuit 40 discharges into a one-shot multivibrator 42 to produce a voltage pulse into the step generator 16 and produce an up-step correction. The operation of the integrator and threshold circuit 40 is controlled by the output of flip-flop 38, an "off" output from flip-flop 38 maintaining the circuit 40 inoperative and an "on" output occurring after the first eight counts rendering it operative. This action will repeat until such time as the threshold level of comparator 14 is raised sufficiently to eliminate the particular pulses. If there are continuous up-step corrections into the step generator 16, the sensitivity of the receiver may be reduced to the point where it is no longer effective for detection purposes. Furthermore, if there are continuous down-step corrections increasing the receiver sensitivity beyond a predetermined limit without noise detection, it is likely there is a system malfunction, and in either case the operator may elect to manually reset the step generator to a different level. For indicating such a condition, the output from the step generator 16 is applied to a low-limit comparator 48 and a high-limit comparator 50 which are, respectively, set to deliver an output voltage at predetermined low and high limits. Upon exceeding either threshold, the output developed will be shown on respective indicators 52 and 54.

In summary, this invention provides a system which is signal ratio governed in action, which is readily adaptable to various applications, and offers major improvements in radar target detection and tracking. Bear in mind that this system does not provide any means for improving the signal-to-noise ratio; using the established signal-to-noise ratio present at the box-car detector, the system establishes optimum receiver sensitivity and false-alarm rate, and therefore provides the greatest accuracy and reliability possible with the established ratio. Its functions are accomplished by automatically adjusting the threshold level of the receiver by digital-to-analog feedback means in each range-gated signal channel at a given false-alarm rate established by design parameters. Long-term gain and reference voltage instabilities are automatically compensated. Initially, the threshold circuit is designed to sense a low false-alarm rate. The system sensitivity is then automatically increased at a given rate until a false-alarm signal is sensed, whereupon a corrective voltage is introduced into the range-gated signal channel to increase the threshold and decrease channel sensitivity.

While in the system as described a false alarm is defined as any burst of signals having less than eight or more than a hundred pulses, these parameters are arbitrary and depend on the particular use to which the radar is put, and depend on range, the nodding rate of the radar, and the size of the target. In general, the number of pulses between eight and one hundred represents the number of hits made by a particular radar as it scans through a particular type of true target. Other modifications of the apparatus will also be apparent to persons skilled in the art, and while the invention was conceived for use in radar detection equipments, the principles are broadly applicable to communication receivers using amplitude-variation means to convey intelligence.

It is intended, therefore, that this invention be limited only by the scope of the appended claims as interpreted in the light of the prior art.

What is claimed is:
1. In a signal receiver, said receiver generating an output when the level of received signals exceeds the threshold level of said receiver, and means for automatically adjusting the threshold level of said receiver to maintain an optimum receiver threshold level relative to receiver sensitivity versus false-alarm rate, said means comprising:
  means for discriminating between a signal and a false alarm;
  means for progressively decreasing the threshold level of said receiver to increase receiver sensitivity; and
  means in response to a false alarm for increasing the threshold level of said receiver, whereby the sensitivity of said receiver is continuously adjusted around that level where false alarms are just barely present in the output of said receiver.

2. The invention as defined in claim 1 wherein said receiver output is a series of output pulses at a given pulse repetition rate, and wherein a false alarm is defined as a number of pulses less than a first given number $N_a$ or more than a second given number $N_b$.

3. The invention as defined in claim 2 wherein said means for discriminating between a signal and a false alarm comprises means for counting said pulses.

4. The invention as defined in claim 2 wherein said receiver is a radar receiver including a trigger generator for continuously producing timing pulses at said given pulse repetition rate, and wherein said means for increasing the threshold level of the receiver comprises:
  means including a first counter for counting said timing pulses, said means generating a first control voltage when said $N_a$ pulses are counted by said counter;
  a second counter for counting said output pulses, said second counter generating a second control voltage when $N_a$ pulses are counted; and
  control means responsive to the presence of said first control voltage and the absence of said second control voltage for increasing the threshold level of said receiver and thereby decreasing receiver sensitivity.

5. The invention as defined in claim 4, and:
  an indicator for said series of output pulses;
  a first normally closed gate coupling said series of output pulses to said indicator; and
  means in response to the counting of $N_a$ pulses by both said first and second counters for opening and closing said gate to indicate said series of output pulses.

6. The invention as defined in claim 4, wherein said control means is a generator, the voltage output level of which is altered by an applied control voltage; and
  a second normally closed gate coupling said first control voltage to said generator, said second gate being opened in response to the presence of said first control votlage and the absence of said second control voltage.

7. The invention as defined in claim 6, wherein said second counter generates a third control voltage when $N_a+1$ pulses are counted, said third control voltage maintaining said second gate closed during the period of the $N_a+1$ pulse.

8. The invention as defined in claim 7 wherein said first counter generates a fourth control voltage when $N_a+2$ timing pulses are counted, said fourth control voltage resetting both of said counters to zero, whereby said counting may be repeated.

9. The invention as defined in claim 6, and indicator means responsive to predetermined upper and lower voltage output levels of said generator for indicating when the maximum and minimum sensitivity levels of said receiver are exceeded.

10. The invention as defined in claim 9, and means for resetting said generator to an acceptable sensitivity level.

11. The invention as defined in claim 4, and:
  an integrator;
  means coupling said output pulses to said integrator, said integrator developing a fifth control voltage only when $N_b$ pulses are applied thereto, said control means being responsive to said fifth control voltage for increasing the threshold of said receiver and decreasing receiver sensitivity.

12. In a pulse modulated radar receiver including an adjustable threshold comparator for passing simulated target pulses only when the established threshold level of the comparator is exceeded, and an indicator for indicating said simulated target pulses, said simulated target pulses being coupled to said indicator through a normally closed indicator gate, and means for automatically adjusting the threshold level of said comparator to an optimum level with respect to receiver sensitivity versus false-alarm rate, the combination comprising:
  a threshold control voltage generator, the output voltage level of which controls the threshold level of said comparator;

means for progressively altering said voltage generator to progressively decrease said threshold level and thereby increase the sensitivity of said receiver;

means for discriminating between a true target and a false alarm, a false alarm being defined as less than a number $N_a$ of simulated target pulses or more than a second number $N_b$ of simulated target pulses, a true target being defined as a number of pulses more than $N_a$ and less than $N_b$;

means responsive to each false alarm for altering said threshold control voltage generator to rapidly increase the threshold level of said comparator; and means responsive to a true target for opening said normally closed indicator gate.

13. The invention as defined in claim 12 wherein said radar receiver also includes a trigger generator for producing trigger pulses at a given pulse repetition rate and wherein said simulated target pulses, if any, are also generated at said rate, and wherein said means for discriminating between a true target and a false alarm and said means for altering said threshold control voltage generator comprises:

a NOT AND gate having an output circuit coupled to said voltage generator, each voltage output of said NOT AND gate, if any, altering the output voltage level of said threshold control voltage generator to increase the threshold level of said receiver;

a flip-flop having a second voltage output coupled to said NOT AND gate, said flip-flop being initially in its "off" state, whereby its voltage output uninhibits said NOT AND gate;

an AND gate having an output circuit coupled to said NOT AND gate and having first and second input circuits;

a first counter for counting said trigger pulses and for generating a first and a second output pulse upon the counting of $N_a$ trigger pulses, said first output pulse being applied to said flip-flop to change its state from "off" to "on" to inhibit said NOT AND gate, said second pulse being applied to the first input circuit of said AND gate;

a second counter for counting said simulated target pulses and for generating a third voltage output upon the counting of the first simulated target pulse, a third output pulse upon the counting of $N_a$ simulated target pulses, and a fourth output pulse upon the counting of $N_a+1$ simulated target pulses, said third output voltage being applied to said AND gate to open said AND gate when said second output pulse from the first counter is also applied to said AND gate, said third output pulse being applied to said NOT AND gate to inhibit said NOT AND gate, said fourth output pulse being applied to said flip-flop to change the state of said flip-flop from "off" to "on" to inhibit said NOT AND gate;

whereby the counting of less than $N_a$ simulated target pulses results in the opening of said AND gate and said NOT AND gate to produce an output from said NOT AND gate to alter said voltage generator, and whereby the counting of more than $N_a$ pulses results in the inhibiting of said NOT AND gate to prevent an output voltage from said NOT AND gate, thereby preventing the altering of said voltage generator.

14. The invention as defined in claim 13 wherein said means for opening said indicator gate comprises a second flip-flop having a fourth voltage output coupled to said indicator gate, said flip-flop being initially in its "off" state for maintaining said gate closed; said second counter generating a fifth output pulse upon the counting of $N_a$ simulated target pulses, said fifth output pulse being applied to said second flip-flop to change the state of said second flip-flop from "off" to "on" to open said indicator gate, whereby $N_a$ pulses result in the opening of said indicator gate.

15. The invention as defined in claim 14, and a second NOT AND gate, the output from said AND gate being applied to the input of said second NOT AND gate, and the output from said second NOT AND gate, if any, being applied to said second flip-flop to reset the state of said second flip-flop from "on" to "off," said fifth pulse being applied to said second NOT AND gate to inhibit said second NOT AND gate, whereby less than $N_a$ pulses results in the closing of said indicator gate.

16. The invention as defined in claim 15 wherein said first counter generates a sixth pulse upon the counting of $N_a+2$ pulses, said sixth pulse resetting said counters to zero.

17. The invention as defined in claim 16, and an integrator, said integrator developing a fifth voltage output when a predetermined threshold representing $N_b$ pulses is exceeded, said simulated target pulses being applied to said integrator, said fifth voltage output being applied to said voltage generator for altering the output level of said generator.

References Cited

UNITED STATES PATENTS 3,214,754   10/1965   Hildebrandt.
3,312,969   4/1967   Halsted.

RODNEY D. BENNETT, JR., *Primary Examiner.*

T. H. TUBBESING, *Assistant Examiner.*

U.S. Cl. X.R.

343—5